US006986267B2

(12) United States Patent  
Mukasa et al.

(10) Patent No.: US 6,986,267 B2  
(45) Date of Patent: Jan. 17, 2006

(54) METHOD OF MANUFACTURING OPTICAL ELEMENT WITH LENS-BARREL

(75) Inventors: Katsunori Mukasa, Saitama (JP); Hiroaki Fujita, Saitama (JP)

(73) Assignee: Fujinon Corporation, Saitama (JP)

( * ) Notice: Subject to any disclaimer, the term of this patent is extended or adjusted under 35 U.S.C. 154(b) by 478 days.

(21) Appl. No.: 10/246,821

(22) Filed: Sep. 17, 2002

(65) Prior Publication Data

US 2003/0056541 A1 Mar. 27, 2003

(30) Foreign Application Priority Data

Sep. 27, 2001 (JP) .............................. 2001-297484

(51) Int. Cl.  
*C03B 11/08* (2006.01)

(52) U.S. Cl. .............................. 65/39; 65/38

(58) Field of Classification Search ............... 65/37, 65/38, 39; 264/1.21, 1.32  
See application file for complete search history.

(56) References Cited

U.S. PATENT DOCUMENTS 4,224,047 A * 9/1980 Kershaw ..................... 65/39  
6,567,224 B2 * 5/2003 Hatakeyama et al. ....... 359/819

FOREIGN PATENT DOCUMENTS

| JP | 62-291609 | | 12/1987 |
|----|-----------|---|---------|
| JP | 63-40733  | * | 2/1988  |
| JP | 63-45137  | * | 2/1988  |
| JP | 4-285020  | * | 10/1992 |
| JP | 6-9231    | * | 1/1994  |
| JP | 6-127956  | * | 5/1994  |

* cited by examiner

*Primary Examiner*—Sean Vincent  
(74) *Attorney, Agent, or Firm*—Jordan and Hamburg LLP

(57) ABSTRACT

The invention relates to a method of manufacturing an optical element with a lens barrel, in which an optical raw material is placed on a placement portion projecting toward the center of the lens barrel from the inner peripheral surface thereof, and assuming that a distance between the opposing ends of the projection of the placement portion is $L_1$, the outside diameter of the optical raw material is $L_2$, the inside diameter of the lens barrel portion which is positioned close to and above the placement portion and to which the perimeter of the optical element obtained after forming is joined is $L_3$, and the inside diameter of the smallest opening on the upper end side of the lens barrel is $L_4$, design is performed to satisfy a relation of $L_1<L_2<L_3<L_4$. Further, a wall surface providing said inside diameter $L_3$ is extended to a predetermined length in parallel with the optical axis to configure a straight wall surface, and the optical raw material placed on the placement portion is pressed by a pair of shaping dies consisting of an upper die and a lower die, causing the outer edge of the raw material to be joined to the straight wall surface of the inside surface of the lens barrel, wherein when the outside diameter of the optical element obtained after forming is assumed to be $L_5$, the configuration is performed to satisfy $L_4<L_5$.

3 Claims, 4 Drawing Sheets

F I G. 1
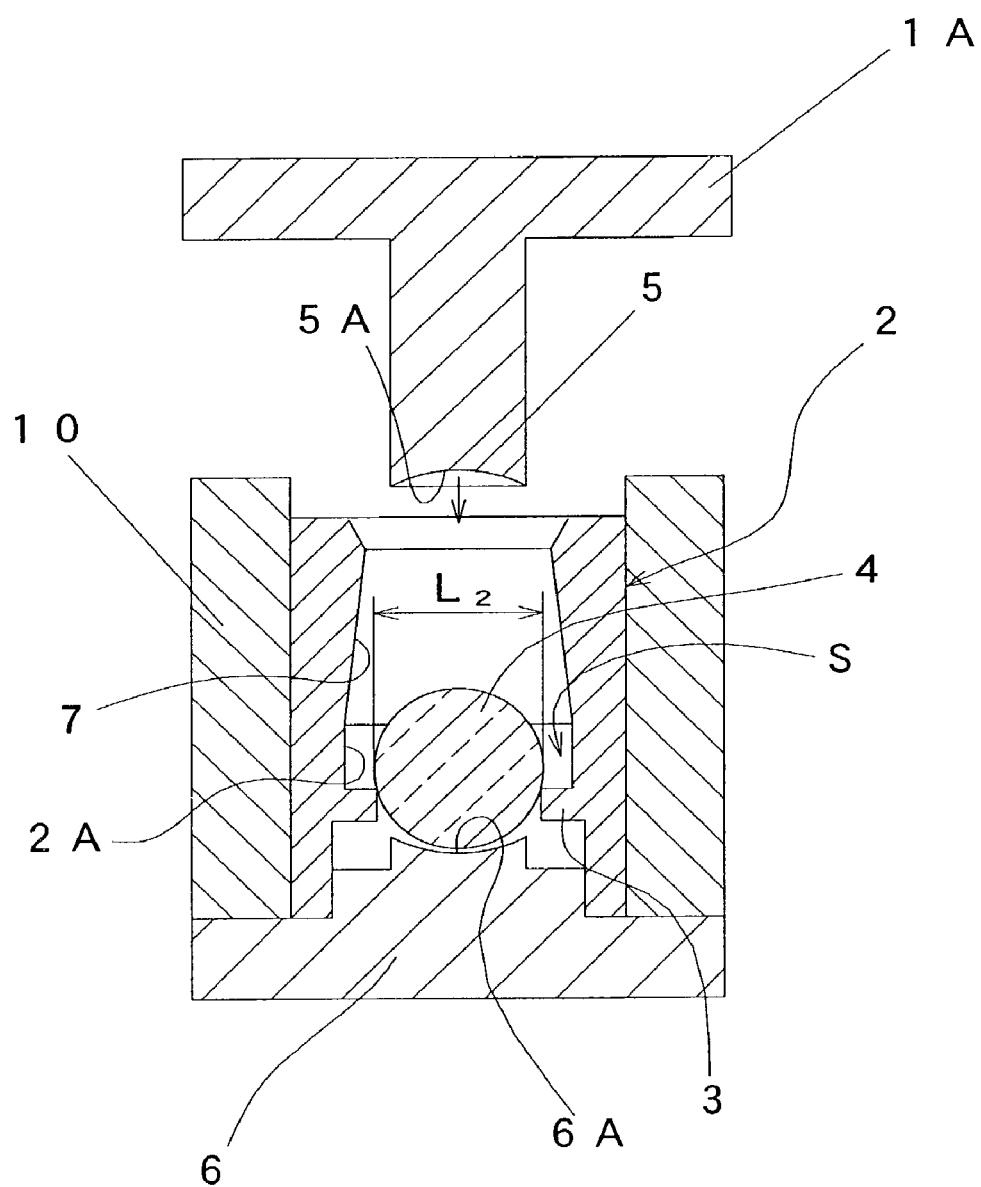

F I G. 3
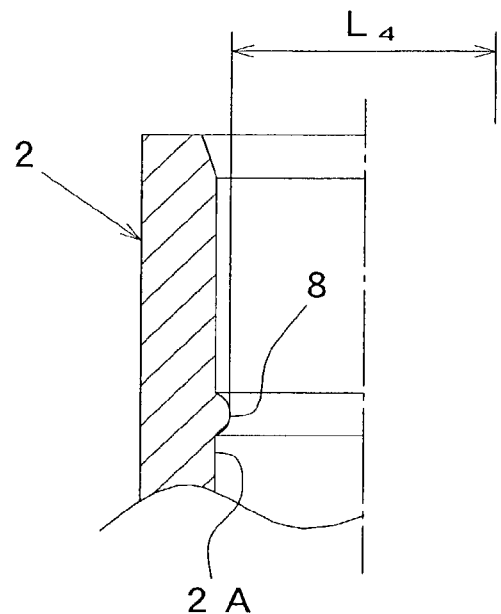
F I G. 4
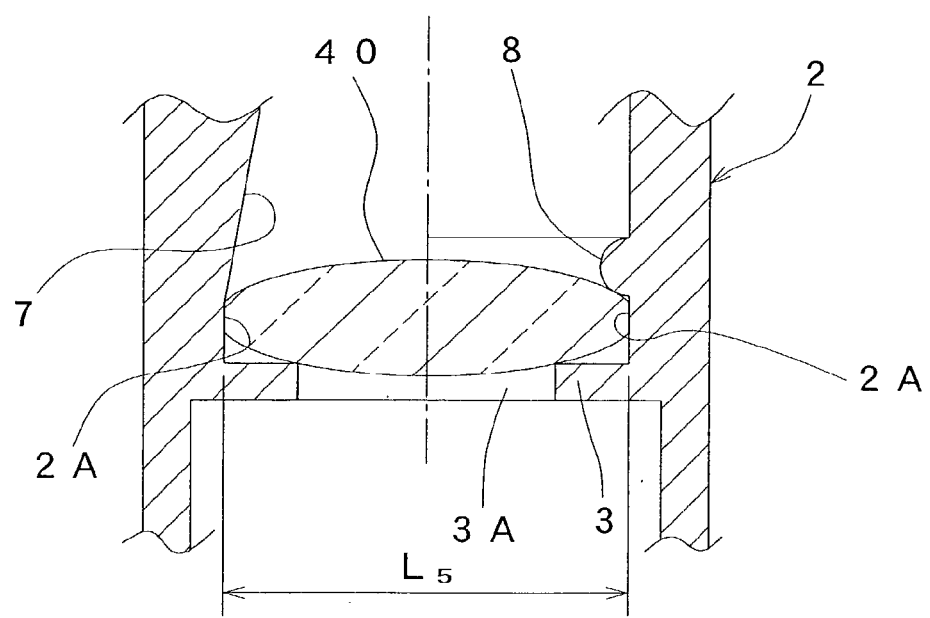

F I G. 5
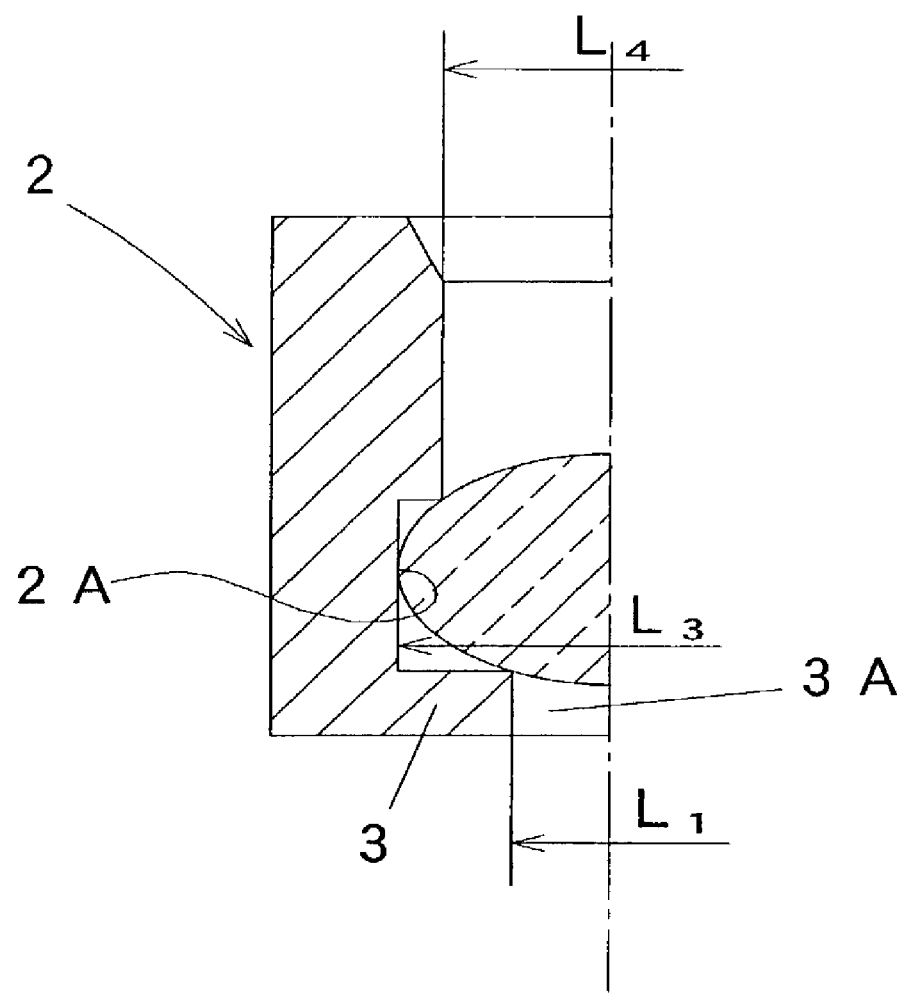

METHOD OF MANUFACTURING OPTICAL ELEMENT WITH LENS-BARREL

BACKGROUND OF THE INVENTION

1. Field of the Invention

The invention relates to a method of manufacturing an optical element with a lens-barrel.

2. Description of the Related Art

In recent years, in a method of manufacturing an optical element (or a glass-formed component) in which an optical raw material (or an optical glass raw material) is heat-softened in a heating furnace and thereafter pressed between an upper die and a lower die, there has been used a method in which the optical raw material is held in a frame member set in the inside of a shaping die and is pressed by the upper die and the lower die, and thereby the raw material is caused to flow in the direction of the outer periphery thereof, causing the outer edge of the raw material to tightly join to the inner peripheral surface of the frame member.

There is also known a scheme to improve the adhesion of the optical raw material to the frame member by shaping unevenness in given sites on the inner peripheral surface of the frame member to which the outer edge of an optical element (glass-formed component) is to join. In this manner, a conventional example for improving the adherence of the optical raw material to the frame member is based on an idea of engaging an excess of glass into the depressed portion of the lens-barrel during pressing. This idea is the same in FIG. 5, in which a depression is provided at the lens-barrel position corresponding to a taper-shaped pointed top, and the top is engaged into the depression. In this case, the flow of an excess of glass becomes offset and thus glass does not flow uniformly, thus resulting in adverse effect on the optical performance of the formed lens, such as a bad distribution of refractive index.

In the conventional example described above, the optical element is integrally joined to the frame member, and the frame member is used as a lens-assembling frame (lens frame)

SUMMARY OF THE INVENTION

Therefore, the invention has an object to provide a method of manufacturing an optical element with a lens-barrel, which method is able to prevent a lens from slipping off the lens-barrel without having adverse effect on the optical performance of the lens, and in which instead of engaging an excess of glass into a depressed portion of the lens barrel to prevent a lens from slipping off the lens-barrel, a slipping off-preventing portion disposed on the bottom surface and the top surface of the lens is used to prevent its slipping off, and thereby, an excess of glass is made uniformly to flow in the direction of the lens outer periphery and is pressed against the lens barrel.

In order to achieve the above object, according to the invention, in a method of manufacturing an optical element with a lens barrel, in which a heat-softened optical raw material is heat compressed by a shaping die so as to be integrally joined to the inside of a lens barrel, the optical raw material is placed on a placement portion projecting toward the center of the lens barrel from the inner peripheral surface thereof, and assuming that a distance between the opposing ends of the projection of the placement portion is $L_1$, the outside diameter of the optical raw material is $L_2$, the inside diameter of the lens barrel portion which is positioned close to and above the placement portion and to which the perimeter of the optical element obtained after forming is joined is $L_3$, and the inside diameter of the smallest opening on the upper end side of the lens barrel is $L_4$, design is performed to satisfy a relation of $L_1<L_2<L_4<L_3$, and a wall surface providing the inside diameter $L_3$ is extended to a predetermined length in parallel with the optical axis to configure a straight wall surface, and the optical raw material placed on the placement portion is pressed by a pair of shaping dies consisting of an upper die and a lower die to cause the outer edge of the raw material to be joined to the straight wall surface of the inside surface of the lens barrel, wherein when the outside diameter of the optical element obtained after forming is assumed to be $L_5$, the configuration is performed to satisfy $L_4<L_5$.

According to the invention, the optical raw material is placed on a placement portion projecting toward the center of the lens barrel from the inner peripheral surface thereof, and assuming that a distance between the opposing ends of the projection of the placement portion is $L_1$, the outside diameter of the optical raw material is $L_2$, the inside diameter of the lens barrel portion which is positioned close to and above the placement portion and to which the perimeter of the optical element obtained after forming is joined is $L_3$, and the inside diameter of the smallest opening on the upper end side of the lens barrel is $L_4$, design is performed to satisfy a relation of $L_1<L_2<L_4<L_3$, and a wall surface providing the inside diameter $L_3$ is extended to a predetermined length in parallel with the optical axis to configure a straight wall surface, and the optical raw material placed on the placement portion is pressed by a pair of shaping dies consisting of an upper die and a lower die to cause the outer edge of the raw material to bejoined to the straight wall surface of the inside surface of the lens barrel, by which when the outside diameter of the optical element obtained after forming is assumed to be $L_5$, $L_4<L_5$ is satisfied. Therefore, an optical element with a lens barrel, not requiring after-working, can be simply manufactured by the press forming of the optical raw material. Also, the press-formed optical element is tightly joined to the straight wall surface of the lens barrel, and moreover there is no fear that the optical element may slip off the lens barrel. Further, even in a small lens-barrel, the junction of the optical element and the lens-barrel can be easily realized. Furthermore, an upper die and a lower die having transfer surfaces are inserted into the lens-barrel, and thus the transfer surfaces can be accurately transferred to the optical raw material in a position close to and above the placement portion of the lens-barrel. Also, as a measure for preventing the optical element from slipping off the lens barrel, the following simple methods can be realized; the inside peripheral surface of the lens barrel portion positioned above the optical element junction position is shaped into an oppositely tapered shape, or the opening of the inside diameter $L_4$ is shaped to be enclosed with a projection projecting from the inside surface of the lens barrel.

BRIEF DESCRIPTION OF THE DRAWINGS

FIG. 1 is a cross sectional view for showing an example of a shaping die for implementing a method of manufacturing an optical element according to the invention;

FIG. 3 is a cross sectional view for showing another embodiment of the lens barrel;

FIG. 4 is a cross sectional view for showing the relation between an optical element obtained after pressing an optical raw material and the lens-barrel; and FIG. 5 is a cross sectional view for showing further another embodiment of the lens-barrel.

DETAILED DESCRIPTION OF THE PREFERRED EMBODIMENTS

Figure 2:
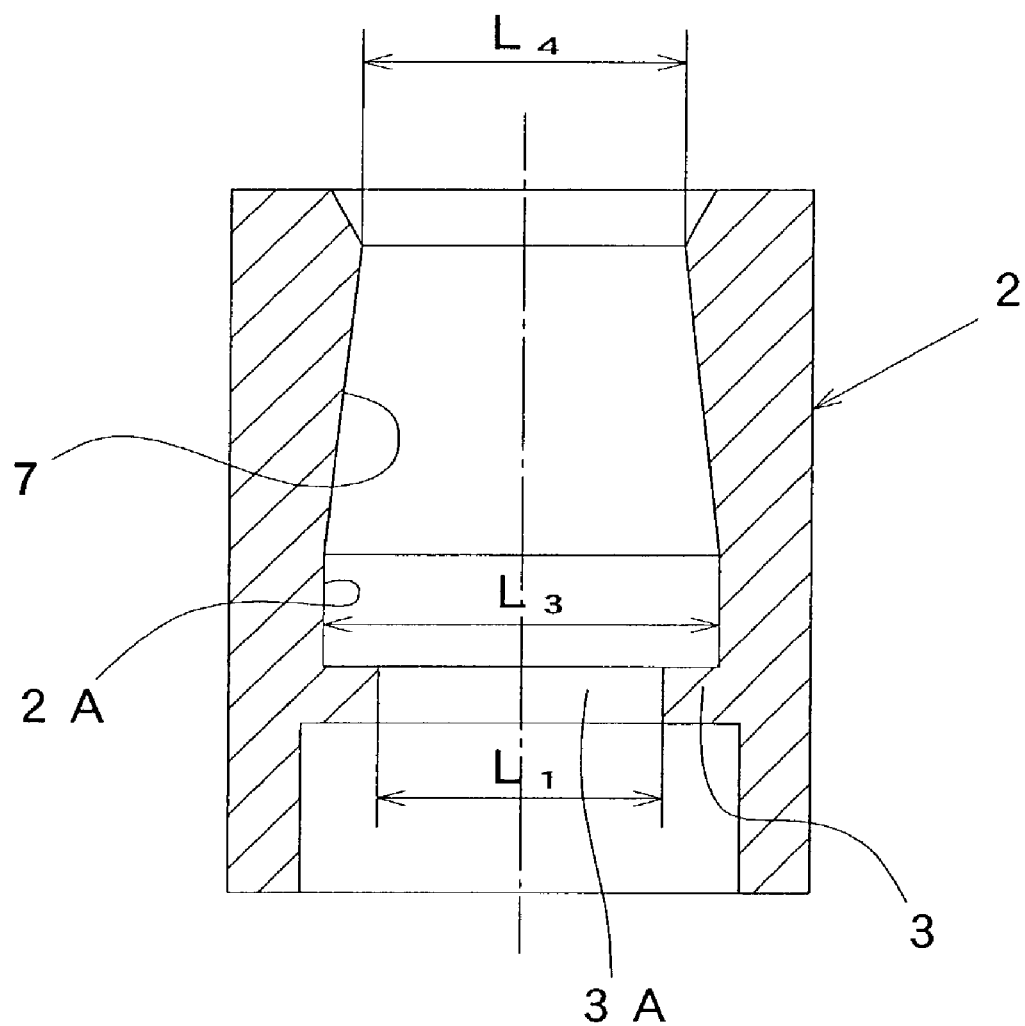
FIG. 2 is a cross sectional view of a lens-barrel set in the shaping die.

FIG. 1 shows a state in which a lens-barrel 2 is set in a shaping die 1 and also an optical raw material (or lens raw material) 4 is placed on a placement portion 3 projecting toward the center of the lens barrel 2 from its inner peripheral surface. The shaping die 1 comprises a upper die 1A and a lower die 1B. Herein, the upper die 1A is provided with an inserting portion 5 having a transfer surface 5A, and the lower die 1B is provided with an inserting portion 6 having a transfer surface 6A. Also, a guide die 10 is mounted on the lower die 1B, and the guide die 10 encloses the lens-barrel 2. The respective transfer surfaces 5A and 6A of the upper and lower dies 1A and 1B make contact with the raw material 4 in the lens barrel 2, and the upper and lower dies 1A and 1B press the optical raw material 4 therebetween, thereby transferring the shapes of the upper and lower transfer surfaces 5A and 6A to the optical raw material 4. The shapes of these transfer surfaces 5A and 6A are not necessarily concave spherical surfaces or concave non-spherical surfaces, and may be surely shaped in any shape matched to a lens shape desired to make by press forming.

The lens barrel 2 is usually formed of stainless steel and the placement portion 3 is shaped like a flange having a hole 3A located in the center thereof. The outside diameter $L_2$ of the optical raw material 4 is larger than the diameter of this central hole 3A, in other words a distance $L_1$ between the ends of the opposing projections of the placement portion 3 (see FIG. 2). Further, for the optical raw material 4, the lens raw material used in this embodiment is shaped like a sphere and made of an optical glass material. The optical raw material 4 in a pre-heated state is placed on the placement portion 3, and further heated by a not shown heating member into a softened state, in which the raw material is then pinched and pressed on the upper and lower thereof by the upper die 1A and lower die 1B.

FIG. 2 shows the cross section of the lens-barrel 2. Assuming that a distance between the ends of the opposing projections of the placement portion 3, i.e. the diameter of the hole 3A is $L_1$, the outside diameter of the optical raw material 4 is $L_2$, the inside diameter of the portion of the lens barrel 2, which portion is positioned close to and above the placement portion 3 and to which portion the outer edge of the optical element 40 obtained after forming is joined, (diameter of the space enclosed with the wall surface) is $L_3$, and the smallest inside diameter of the opening on the upper-end side of the lens barrel 2 is $L_4$, the design is performed to satisfy a relation of $L_1<L_2<L_4<L_3$. A straight wall surface 2A is configured by extending a wall surface with the inside diameter $L_3$ to a predetermined length in parallel with the optical axis. The portion of the inside diameter $L_3$ i.e. the portion enclosed with the straight wall surface 2A configures a space for receiving an optical element 40 obtained after press forming of the optical raw material 4. Further, the inner peripheral surface extending from this space to an upper position with the opening inside diameter $L_4$ is shaped in an oppositely tapered shape in which the diameter gradually decreases with approaching to the upper position. The opening inside diameter $L_4$ is shaped to be larger than the outside diameter of the optical raw material 4 as previously described, and the optical raw material 4 can be placed on the placement portion 3 from this opening portion of the inside diameter $L_4$. Also, as a matter of course, the size of the inserting portion 5 is smaller than the opening inside diameter $L_4$. In FIG. 2, a reference numeral 7 denotes the tapered surface of the inner peripheral surface of the lens barrel 2.

The lens-barrel 2 shown in FIG. 3 is an example in which the tapered surface 7a is not shaped above the straight wall surface 2A but a projection 8 is shaped instead. The portion of the opening in side diameter $L_4$, enclosed with the projection 8, is in the same relation as described above. Further, it is possible to implement a type of combined use in which the projection 8 is also shaped on the base-end side of the tapered surface 7.

FIG. 4 shows a state in which after press forming of the optical raw material (lens raw material) 4, an optical element (or lens) 40 is received in the space close to and above the placement portion 3 of the lens barrel 2, and the outer edge of the optical element 40 is tightly joined to the straight wall surface 2A of the lens barrel 2. Herein, in the right half of this figure, the projection 8 exists on the outer edge of the optical element 40, and in the left half, the base-end side of the tapered surface 7 exists on the outer edge of the optical element 40. The existence of the tapered surface 7 and projection 8 can prevent the optical element 40 from slipping off the inside of the lens-barrel 2. The placement portion 3 prevents the optical element 40 from slipping off downward. When pressed, the optical raw material 4 undergoes pressure on its upper and lower by the inserting portions 5 and 6, and thereby it is plastically deformed into a target shape according to the respective transfer surfaces 5A and 6A of these inserting portions 5 and 6. At this time, relief or space is provided in between the raw material and the straight wall surface 2A to the extent that the outer edge of the optical raw material 4 may flow outward, so that the optical raw material 4 flows into this space for relief (denoted as a reference character S in FIG. 1). By adjusting the amount of the optical raw material 4 used and the space S produced between the optical raw material and the straight wall surface 2A when the optical raw material 4 is placed, the amount and the space are set such that the raw material can flow in this space S without overflowing out of the space S during press forming of the optical raw material 4 (for example, not to overflow in the direction of the tapered surface 7 and the projection 8, and not to overflow below the placement portion 3), and at the same, the amount is set enough to cause the raw material to tightly join to the straight wall surface 2A. By the way, with regard to the optical raw material 4 for use in press forming, various raw materials are on sale from various makers. When we wish to purchase a desired quantity of the optical raw material 4 to manufacture an optical element with a lens-barrel, by designing of the volume of the portion of the space S, that is, designing of the inside of the lens-barrel 2, tight junction of the lens-barrel 2 and the optical element 40 can be improved. Also, even if there are variations in the quantity of the optical raw material 4, the space can absorb an excess and lack of the quantity so as not to make the joining impossible. This means that the quantity of the optical raw material 4 to be used is not necessary to be precise and the use of varying quantities can also provide products having the same function and junction strength.

The lens-barrel 2 shown in FIG. 5 faces the outer periphery side of the optical raw material 4 placed on the placement portion 3, and pre-forms, as a hollow 9, the space for receiving the outer edge of the optical element 40 obtained after press forming. The straight wall surface is shaped like such as letters U, V, and a Japanese letter ] within the hollow 9. The shape of the straight wall surface 2A should be patterned following the shape of the outer edge of the optical element 40. The inner peripheral surface of portion extending above the hollow 9 of the lens-barrel 2 is formed as a straight wall surface instead of the tapered surface 7, and further the projection 8 is not provided thereon.

What is claimed is:

1. A method of manufacturing an optical element with a lens barrel, in which a heat-softened optical raw material is heat compressed by a shaping die so as to be integrally joined to the inside of a lens barrel, comprising the steps of:

placing the optical raw material on a placement portion projecting toward the center of the lens barrel from the inner peripheral surface thereof, performing design to satisfy a relation of $L_1<L_2<L_3<L_4$, herein, $L_1$ is a distance between the opposing ends of the projection of the placement portion, $L_2$ is the outside diameter of the optical raw material, $L_3$ is the inside diameter of the lens barrel portion which is positioned close to and above the placement portion and to which the perimeter of the optical element obtained after forming is joined, and $L_4$ is the inside diameter of the smallest opening on the upper end side of the lens barrel, extending a wall surface providing said inside diameter $L_3$ to a predetermined length in parallel with the optical axis to shape a straight wall surface, and pressing the optical raw material placed on the placement portion by a pair of shaping dies consisting of an upper die and a lower die to cause the outer edge of the raw material to be joined to the straight wall surface of the inside surface of the lens barrel, wherein $L_4<L_5$ is satisfied, herein $L_5$ is the outside diameter of the optical element obtained after forming.

2. The method of manufacturing an optical element with a lens barrel according to claim 1, wherein the inner peripheral surface above the lens barrel portion to which the optical element is joined is shaped in an oppositely tapered shape.

3. The method of manufacturing an optical element with a lens barrel according to claim 1, the opening inside diameter $L_4$ is shaped to be enclosed with a projection projecting from the inside surface of the lens barrel.

* * * * *